United States Patent [19]

Greer et al.

[11] 4,307,617

[45] Dec. 29, 1981

[54] INDICATING AND CONTROL APPARATUS UTILIZING HALL EFFECT ELEMENTS

[75] Inventors: Homer L. Greer, Bryn Athyn; John R. Malloy, Drexel Hill; Clark M. Rosenblum, Glenside, all of Pa.

[73] Assignee: Honeywell Inc., Minneapolis, Minn.

[21] Appl. No.: 150,414

[22] Filed: May 12, 1980

[51] Int. Cl.³ .......................... G01L 9/00; H01L 43/06
[52] U.S. Cl. .................................... 73/753; 338/32 H; 323/368
[58] Field of Search ............. 323/94 H, 95; 338/32 H, 338/32 R; 335/207, 205; 73/147, 753

[56] References Cited

U.S. PATENT DOCUMENTS

| | | | |
|---|---|---|---|
| 2,252,464 | 8/1941 | Kearns et al. | 73/147 |
| 2,393,669 | 1/1946 | Wheaton et al. | 73/147 |
| 2,766,445 | 10/1956 | Bland | 340/345 |
| 2,908,778 | 10/1959 | Strandberg | 200/19 |
| 2,935,583 | 5/1960 | Howell | 200/87 |
| 2,957,345 | 10/1960 | Cheney | 73/756 |
| 2,972,740 | 2/1961 | Lahti | 340/347 |
| 3,095,735 | 7/1963 | Menzel | 73/147 |
| 3,100,299 | 8/1963 | Congdon | 340/347 |
| 3,710,360 | 1/1973 | Flachsbarth | 340/174.1 H |
| 3,714,827 | 2/1973 | Batts | 73/147 |
| 3,777,273 | 12/1973 | Baba et al. | 338/32 H |
| 3,858,145 | 12/1974 | Sulich et al. | 338/32 H |
| 3,873,957 | 3/1975 | Wurscher et al. | 338/32 H |
| 3,882,337 | 5/1975 | Pfeffer et al. | 310/273 |
| 3,994,010 | 11/1976 | Geske | 357/27 |
| 4,054,860 | 10/1977 | Henderson et al. | 338/32 H |

*Primary Examiner*—Donald O. Woodiel
*Attorney, Agent, or Firm*—Laurence J. Marhoefer; Lockwood D. Burton; Mitchell J. Halista

[57] ABSTRACT

An indicating and control apparatus uses Hall effect elements arranged on one side of a non-magnetic wall separating the elements from selectively positionable respective magnets. The magnets are selectively positioned adjacent to the non-magnetic wall to energize respective ones of the Hall effect elements by a code disc which is selectively positionable and displaceable with respect to the wall. The code disc is attached to a manually rotatable knob projecting from a housing enclosing the selectively positionable magnets and having a dial face on the exterior surface of the housing to cooperate with an indicator on the knob. The Hall effect elements, in turn, are located on a printed circuit board and are connected to associated circuitry to bias the Hall effect elements and to utilize output signals from the Hall effect elements. In a specific embodiment the printed circuit board is associated with a pressure sensor which is arranged to supply electrical signals representative of respective fluid pressures to signal storage elements on the printed circuit board in combination with the output signals from the Hall effect elements for utilization as data and control signals, respectively, by a data processing system connected to the indicating and control apparatus.

9 Claims, 3 Drawing Figures

FIG. I

INDICATING AND CONTROL APPARATUS UTILIZING HALL EFFECT ELEMENTS

BACKGROUND OF THE INVENTION

1. Field of the Invention

The present invention relates to position indicating and control apparatus. More specifically, the present invention is directed to a position indicating and control apparatus utilizing Hall effect elements for translating a shaft position to a corresponding signal.

2. Description of the Prior Art

Prior art indicating and control apparatus for translating a shaft motion to digital signals have usually involved mechanical switches which operate in conjunction with brushes contacting a so-called code converter plate having coded conductive patterns thereon. Such indicating and control devices are shown in U.S. Pat. Nos. 2,766,445 and 2,935,583. The use of magnets for transmitting signals through a non-magnetic wall is shown in U.S. Pat. Nos. 2,908,778 and 2,935,583. The use of selectively positionable magnets for actuating Hall effect elements or devices is found in the prior art in U.S. Pat. Nos. 4,107,604 and 4,054,860. In order to provide an indicating device utilizing Hall effect devices which affords the protection of closed housings separating the Hall effect elements from the actuating magnets while providing a coded operation for conversion from the rotary motion of a control knob to a digital output of the Hall effect signals is a desirable apparatus having significant utility in specific combination with fluid devices utilizing fluid-tight chambers.

SUMMARY OF THE INVENTION

An object of the present invention is to provide an improved indicating and control apparatus for converting a rotary shaft motion to a digital output signal.

In accomplishing this and other objects, there has been provided, in accordance with the present invention, an indicating and control device having Hall effect devices located on the opposite side of a non-magnetic wall from selectively positionable control magnets. The magnets are selectively operated to a position adjacent to the non-magnetic wall to energize the Hall effect devices by a code plate selectively positionable by a manually adjustable control knob. The control knob is initially rotated to position the code plate and is subsequently depressed to selectively shift the magnets to a position against the non-magnetic wall whereby an output signal from respective ones of the Hall effect devices is produced.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT DETAILED DESCRIPTION

Figure 1:
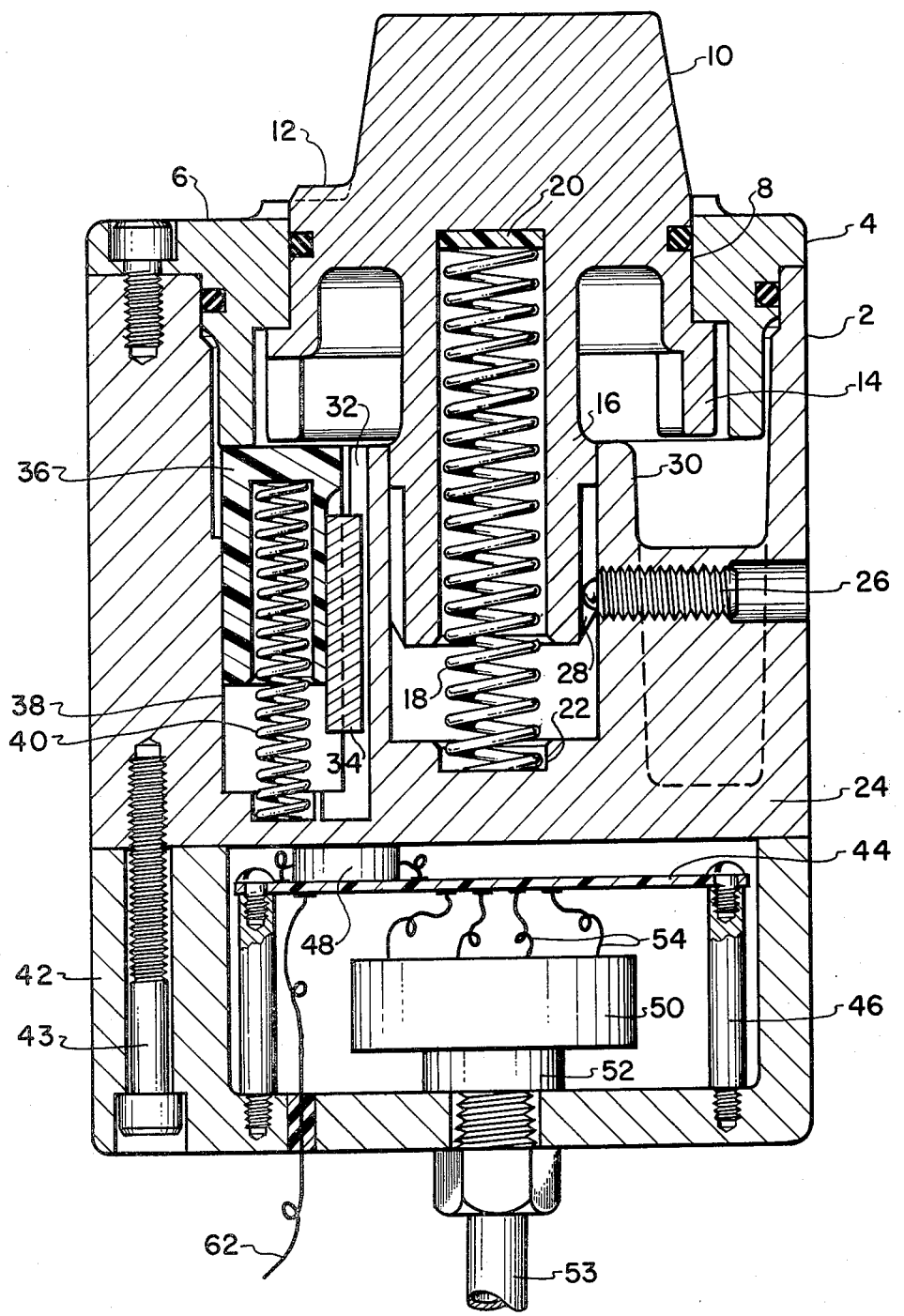
FIG. 1 is a cross sectional illustration of an example of an indicating and control apparatus utilizing the embodiment of the present invention.

Referring to FIG. 1 in more detail, there is shown an indicating and control apparatus having a fluid-tight housing 2 with a cover 4 attached across an open end thereof. The cover 4 is arranged to carry control indicia on an outer face 6 surrounding a central opening in the cover 4. A rotatable knob 10 is arranged to project through the central opening 8 and to support a pointer 12 on an outside end surface thereof. The knob 10 is coaxially attached to a code plate 14 within the housing 2. A coaxial hollow cylindrical extension 16 of the knob 10 extends into the housing 2 and surrounds a spring 18 located therein. The spring 18 is arranged to extend between a low friction washer 20 located at one end of the extension 16 projecting from the underside of the knob 10 and a shallow well 22 axially aligned with a free end of the extension 16 of the knob 10.

The code plate 14 is provided with a conventional spring detent 26 arranged to cooperate with slots 28 in an outer periphery of the extension 16 to provide a locating or detenting operation for the knob 10. An inner support web 30 is attached to the inner surface of the housing 2 and has apertures 32 in its outer periphery arranged to guide magnets 34 connected to respective hollow pushbuttons 36. Pushbuttons 36 are each located in respective wells 38 in the web 30 and are biased by an internal spring 40 located within the pushbutton 36 between the internal end of the pushbutton 36 and the inner surface of the housing 2. While a single pushbutton structure 36 is shown in FIG. 1, a plurality of similar pushbuttons 36 would be coaxially arranged encircling the extension 16.

On the other side of a wall 24 of the housing 2 is located a cover 42 attached to the wall 24 by screws such as screw 43. The cover 42 houses a printed circuit board 44 supported on support studs 46. A plurality of Hall effect elements 48 are mounted on the printed circuit board 44 adjacent to the dividing wall 24 and aligned with respective ones of the magnets 34 on the pushbuttons 36, i.e., a separate Hall effect element is located adjacent to each of the pushbutton and magnet combinations 36, 34. A conventional fluid pressure transducer 50 is located within the cover 42 and is provided with a fluid input passageway 52 passing through the wall of the cover 42 to be connected to a source of fluid by a pipeline 53. Connecting wires 54 are arranged to apply output data signals from the pressure transducer 50 to associated circuitry on the printed circuit board 44. This circuitry is also arranged to apply bias signals to the Hall effect elements 48 and to receive output signals from the Hall effect devices 48.

MODE OF OPERATION

Figure 2:
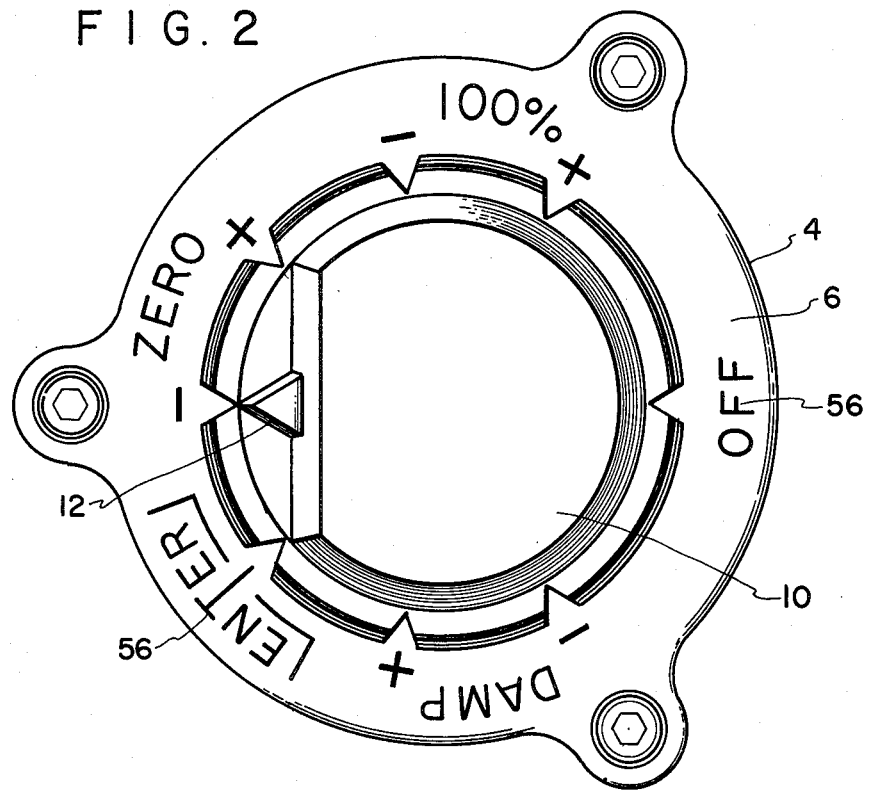
FIG. 2 is a top view of the indicating and control apparatus shown in FIG. 1
Figure 3:
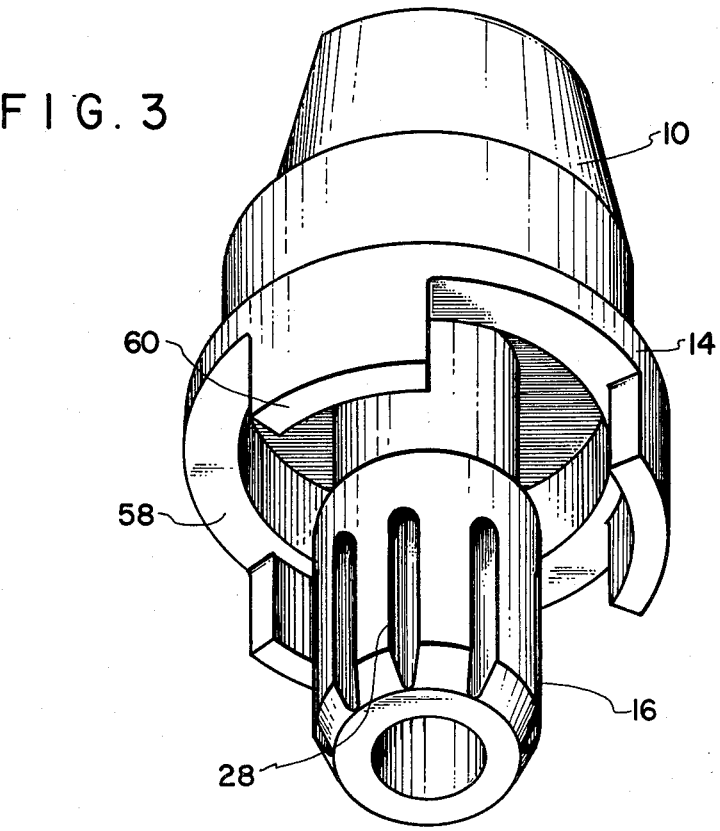
FIG. 3 is an isometric view of the bottom of the control knob and code wheel used in the device shown in FIG. 1.

In FIG. 2 there is shown a top view of the cover 4 and control knob 10 used in the embodiment of the invention illustrated in FIG. 1. The top view in FIG. 2 shows the control indicia 56 on the face 6 and the relationship of the indicia 56 to the pointer 12 on the knob 10. Thus, the rotation of the knob 10 is effective to align the pointer 12 with the indicia 56 in conjunction with a position control of the detent 26. In FIG. 3, there is shown an isometric view of the bottom of the control knob 10 and code plate 14 illustrating the coded cutouts 58 and intermediate lands 60 in the code plate 14 which are correlated to the indicia 56 and the pushbuttons 36, i.e., pushbuttons 36 aligned with the cutouts 58 are not operated by the depression of the control knob 10 while the pushbuttons 36 aligned with the lands 60 are operated by the depression of the control knob 10. Consequently, a rotation of control knob 10 to align the pointer 12 with a desired one of the indicia 56 is effective to align the attached code plate 14 with corresponding ones of the pushbuttons 36. A subsequent depression or movement of the knob 10 toward the wall 24 against the pressure of the spring 18 is effective to move the code plate 14 toward the pushbuttons 36. The pushbuttons 36 which are aligned with the lands 60 on the code plate 60 will be depressed against the spring pressure of their internal springs 40 to move the attached magnets 34 to the wall 24. When the magnet 34 is positioned against the wall 24, its magnetic field will penetrate through the non-magnetic wall 24 to actuate, or energize, the respective Hall effect device 48. As a result, the Hall effect devices 48 which are energized by the magnets 34 and the bias signals from the circuits on the printed circuit card 44 will produce output signals for application to the circuits on the printed circuit card 44. These output signals from the Hall effect devices 48 are concurrent signals which are identified as digital bits of a digital word suitable for use as a control signal for the appropriate data handling circuitry on the printed circuit card, e.g., a microprocessor. Such control signals can be used to affect the data handling routines or programs of the microprocessor to manage the data signals from the transducer 50 to produce resulting data handling system output signals. The output signals from the data handling circuitry on the printed circuit card 44 would be applied via an electrical conductor cable 62 passing out of the cover 42 to associated devices, process controllers, recorders, system computers, etc., (not shown).

Accordingly, it may be seen that there has been provided, an improved shaft rotation to digital word conversion apparatus in an indicating and control device.

The embodiments of the invention in which an exclusive property or privilege is claimed are defined as follows:

1. An indicating and control apparatus comprising:
a plurality of Hall effect devices,
a plurality of magnets,
a plurality of pushbutton means with each of said pushbutton means supporting a respective one of said magnets spaced from a respective one of said Hall effect devices,
a non-magnetic wall means between said Hall effect devices and said magnets for supporting said pushbutton means,
code plate means rotatable among a plurality of positions for selectively providing at each position a pushbutton actuation operation for a respective predetermined number of said pushbutton means toward said wall means to position associated ones of said magnets adjacent to a respective one of said Hall effect devices to energize said respective one of said Hall effect device, and
control knob means attached to said code plate means for rotating said code plate to each of said positions and urging said code plate toward said pushbuttons at each of said positions to produce said pushbutton actuation operation.

2. An indicating and control apparatus as set forth in claim 1 wherein said Hall effect devices and said magnets are arranged on similar diameter circles and said code plate means includes a rigid plate positioned for coaxial rotation on said circles and having selectively arranged cutouts and intermediate lands with each cutout being dimensioned to admit a pushbutton means and each land being dimensioned to contact a pushbutton means.

3. An indicating and control apparatus as set forth in claim 2 wherein each of said pushbutton means includes a hollow cylinder, spring means within said cylinder to bias said cylinder toward a first position while said code plate means is arranged to urge said cylinder to a second position to energize a respective one of said Hall effect devices, and means for attaching a corresponding one of said magnets to said cylinder.

4. An indicating and control apparatus as set forth in claim 1 and further including printed circuit board means for supporting said Hall effect devices and having associated circuits for biasing said Hall effect devices and for responding to output signals from said Hall effect devices.

5. An indicating and control apparatus as set forth in claim 1 and further including detent means for restraining said code plate means in each of said plurality of positions.

6. An indicating and control apparatus as set forth in claim 1 wherein said code plate means is attached coaxially to said knob means for coaxial rotation therewith.

7. An indicating and control system comprising
electrical data signal handling means for selectively handling electrical signal input data according to a selected one of a plurality of a predetermined programs in response to respective ones of a plurality of control signals,
input data supply means for supplying electrical signal input data to said data signal handling means,
an indicating and control means for selectively generating ones of said plurality of control signals by a mechanical position to electrical signal conversion for each of said control signals and for providing a visual indication of the selection of the control signal to be generated by said conversion and
means for applying said control signals to said handling means for selecting a corresponding one of said programs for handling said input data wherein said indicating and control means includes
a plurality of Hall effect devices,
a plurality of magnets,
a plurality of pushbutton means with each of said pushbutton means supporting a respective one of said magnets spaced from a respective one of said Hall effect devices,
a non-magnetic wall means between said Hall effect devices and said magnets for supporting said pushbutton means,
code plate means rotatable among a plurality of positions for selectively providing at each position a pushbutton actuation operation for a respective predetermined number of said pushbutton means toward said wall means to position associated ones of said magnets adjacent to a respective one of said Hall effect devices to energize said respective one of said Hall effect, devices and
control knob means attached to said code plate means for rotating said code plate to each of said positions and urging said code plate toward said pushbuttons at each of said positions to produce said pushbutton actuation operation.

8. An indicating and control system as set forth in claim 7 wherein said input data supply means includes a mechanical motion to electrical signal transducer for generating said electrical signal input data.

9. An indicating and control system as set forth in claim 8 wherein said transducer includes a fluid pressure to electrical signal conversion means for converting fluid pressure to respective electrical signal input data for said data signal handling means.

* * * * *